(12) United States Patent
Kakizaki

(10) Patent No.: US 12,047,402 B2
(45) Date of Patent: Jul. 23, 2024

(54) GENERATING MODEL FOR CONTROLLING ACTUATORS BASED ON TIME-SERIES SENSOR DATA

(71) Applicant: NEC Corporation, Tokyo (JP)

(72) Inventor: Kazuya Kakizaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 576 days.

(21) Appl. No.: 17/295,116

(22) PCT Filed: Nov. 22, 2018

(86) PCT No.: PCT/JP2018/043234
§ 371 (c)(1),
(2) Date: May 19, 2021

(87) PCT Pub. No.: WO2020/105179
PCT Pub. Date: May 28, 2020

(65) Prior Publication Data
US 2022/0006824 A1    Jan. 6, 2022

(51) Int. Cl.
*H04L 9/40* (2022.01)
*G06N 5/02* (2023.01)

(52) U.S. Cl.
CPC ........... *H04L 63/1425* (2013.01); *G06N 5/02* (2013.01)

(58) Field of Classification Search
CPC ......... G06F 21/57; G06F 21/577; G06N 5/02; H04L 63/1416; H04L 63/1425
See application file for complete search history.

(56) References Cited

U.S. PATENT DOCUMENTS

2017/0103148 A1    4/2017   Natsumeda
2017/0310690 A1   10/2017   Mestha et al.
(Continued)

FOREIGN PATENT DOCUMENTS

| JP | 2017-199365 A | 11/2017 |
|----|---------------|---------|
| WO | 2015/145500 A1 | 10/2015 |

OTHER PUBLICATIONS

R. Mitchell and I. -R. Chen, "Effect of Intrusion Detection and Response on Reliability of Cyber Physical Systems," in IEEE Transactions on Reliability, vol. 62, No. 1, pp. 199-210 (IEEE Mar. 2013) (Year: 2013).*

(Continued)

*Primary Examiner* — Theodore C Parsons

(57) ABSTRACT

A control system (10) includes plural sensors (14), plural actuators (16), and a controller (18). An information processing apparatus (2000) acquires configuration information representing a configuration of the control system (10), a control rule representing a rule of control of each actuator (16) by the controller (18), and behavior log data indicating a combination of time-series data of an observed value of the sensor (14), and a state of each actuator (16) at each time. The information processing apparatus (2000) generates, for each combination of states of the actuators (16) and for the each sensor (14), a behavioral function representing a temporal change of the observed value of the sensor (14) regarding the combination of states of the plural actuators, using the behavioral log data, and generates a system model of the control system (10) using the configuration information, the control rule, and the behavioral function.

7 Claims, 9 Drawing Sheets

(56) References Cited

U.S. PATENT DOCUMENTS

| | | | |
|---|---|---|---|
| 2019/0228110 A1* | 7/2019 | Yan | G06N 3/047 |
| 2019/0253440 A1* | 8/2019 | Mathur | G06F 21/554 |
| 2020/0067969 A1* | 2/2020 | Abbaszadeh | G06N 20/10 |
| 2020/0125978 A1* | 4/2020 | Abbaszadeh | H04L 63/14 |
| 2020/0137090 A1* | 4/2020 | Holzhauer | H04L 63/1416 |

OTHER PUBLICATIONS

Morris, Thomas H., Zach Thornton and Ian P. Turnipseed. "Industrial Control System Simulation and Data Logging for Intrusion Detection System Research." (2015). (Year: 2015).*

David I. Urbina, Jairo A. Giraldo, et al. 2016. Limiting the Impact of Stealthy Attacks on Industrial Control Systems. In Proceedings of the 2016 ACM SIGSAC Conference on Computer and Communications Security (CCS '16). Association for Computing Machinery, New York, NY, USA, 1092-1105 (ACM 2016) (Year: 2016).*

International Search Report for PCT Application No. PCT/JP2018/043234, mailed on Feb. 26, 2019.

Eunsuk et al., "Model-Based Security Analysis of a Water Treatment System", 2016 IEEE/ACM 2nd International Workshop on Software Engineering for Smart Cyber-Physical Systems, May 16, 2016, Austin, TX, USA, Jan. 9, 2017.

* cited by examiner

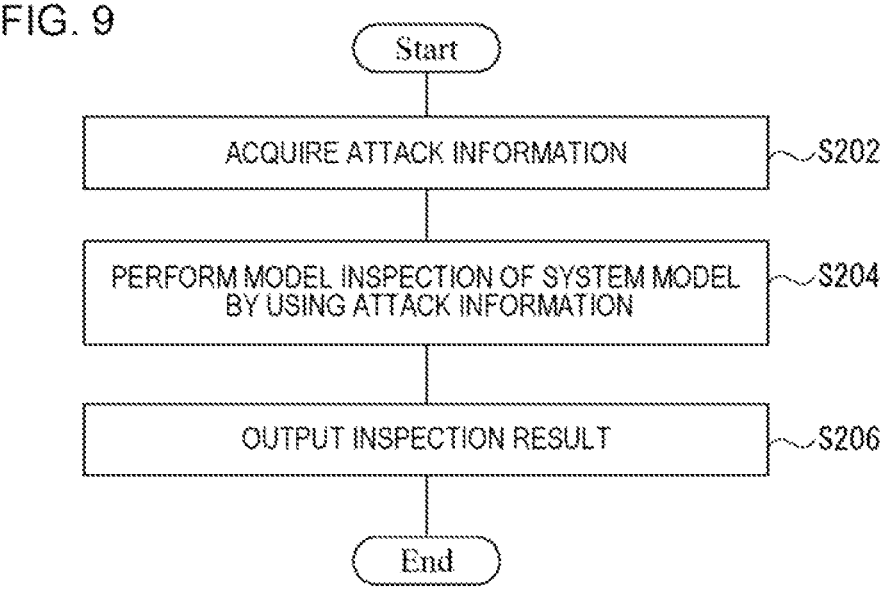

GENERATING MODEL FOR CONTROLLING ACTUATORS BASED ON TIME-SERIES SENSOR DATA

This application is a National Stage Entry of PCT/JP2018/043234 filed on Nov. 22, 2018, the contents of all of which are incorporated herein by reference, in their entirety.

TECHNICAL FIELD

The present invention relates to model inspection of a control system.

BACKGROUND ART

As a system for controlling a plurality of equipment, a control system is known. The control system may be used within an important infrastructure facility such as a power plant, and implementation of appropriate security assessment is needed.

The security assessment is clarifying a possibility (risk) with which damage may occur in target property due to threat and fragility, analyzing factors of the risk, evaluating a degree of influence, loss, and the like, and implementing measures, based on a result thereof. Herein, in order to efficiently implement measures against multitudes of risks which may be present within a limited budget, it is necessary to appropriately analyze and evaluate the risks. For example, in a risk based on an attack, it is important to clarify not only whether the attack is likely to be successful, but also a procedure (attack scenario) until the attack is successful, and the like.

Note that, an "attack" in the present description indicates a behavior of an attacker for causing a control system to attain a state (hereinafter, an anomalous state) that the control system never attains in a normal operation. An "attacker" indicates a person or an organization which implements an attack against the system. A state of the control system targeted by the attack is referred to as an attack goal.

As one of methods of achieving security assessment, there is a method of employing a model inspection tool. The model inspection tool acquires, as an input, a model of a target system written with use of a dedicated language, and comprehensively investigates a state that the model satisfies by using a satisfiability problem (SAT) solver and the like. Thus, whether a state attainable by the model satisfies a specification is automatically verified. In this way, the model inspection tool comprehensively and automatically verifies correctness of the specification with respect to the target system. Employing the model inspection tool enables confirming an example of a model that satisfies a specification, and a counterexample of a model that does not satisfy a specification at a time of verification.

There is Non-Patent Document 1 (NPL 1) as a prior art disclosing security assessment employing a model inspection tool. NPL 1 discloses model inspection of a control system employing a model inspection tool called Alloy Analyzer.

In NPL1, a model representing a configuration of a control system and an ability of an attacker is generated, and the model is verified by using a model inspection tool. At this occasion, by handling, as a specification, a state of the control system being an attack goal, an attack procedure that satisfies the specification, specifically, an attack procedure capable of attaining the attack goal is comprehensively investigated.

Herein, a control system being a target in NPL 1 is constituted of one sensor, a plurality of actuators, and a plurality of controllers. The sensor measures a physical value pertaining to a control target. The actuator is an apparatus for controlling the physical value of the control target to be measured by the sensor. The controller is an apparatus for controlling the actuator, based on the physical value measured by the sensor. More specifically, for example, the controller compares a physical value acquired from the sensor with a set threshold value, and transmits a control signal to the actuator according to a result of the comparison.

RELATED DOCUMENTS

Non Patent Documents

[Non-Patent Document 1] Eunsuk Kang, Sridhar Adepu, Daniel Jackson, Aditya P. Mathur, "Model-Based Security Analysis of a Water Treatment System", International Workshop on Software Engineering for Smart Cyber-Physical Systems, 2016

SUMMARY OF THE INVENTION

Technical Problem

The control system disclosed in NPL 1 includes only one sensor. Therefore, NPL 1 does not mention security assessment regarding a more complicated control system including a plurality of sensors.

In view of the above-described problem, one of objects of the present invention is to provide a technique for achieving verification of safety employing model inspection regarding a control system including a plurality of sensors.

Solution to Problem

An information processing apparatus according to the present invention includes: 1) a first acquisition unit that acquires configuration information representing a configuration of a system including a plurality of sensors for observing a physical value pertaining to a control target, a plurality of actuators for changing a behavior of the control target, and a controller for controlling each of the actuators, and a control rule representing a rule of control of each of the actuators by the controller; 2) a second acquisition unit that acquires, for each of the sensors, behavioral log data indicating a combination of time-series data of the physical value observed by the sensor, and a state of each of the actuators at each time; 3) a first generation unit that generates, for each combination of states of the plurality of actuators and for the each sensor, a behavioral function representing a temporal change of the physical value to be observed by the sensor regarding the combination of the states of the actuators, by using the behavioral log data; and 4) a second generation unit that generates a system model of the system by using the configuration information, the control rule, and the behavioral function.

A control system according to the present invention is performed by a computer. The control method includes: 1) a first acquisition step of acquiring configuration information representing a configuration of a system including a plurality of sensors for observing a physical value pertaining to a control target, a plurality of actuators for changing a behavior of the control target, and a controller for controlling each of the actuators, and a control rule representing a rule of control of each of the actuators by the controller; 2) a second acquisition step of acquiring, for each of the sensors, behavioral log data indicating a combination of time-series data of the physical value observed by the sensor, and a state of each of the actuators at each time; 3) a first generation step of generating, for each combination of states of the plurality of actuators and for the each sensor, a behavioral function representing a temporal change of the physical value to be observed by the sensor regarding the combination of the states of the actuators, by using the behavioral log data; and 4) a second generation step of generating a system model of the system by using the configuration information, the control rule, and the behavioral function.

A program according to the present invention causes a computer to execute each step included in the control method according to the present invention.

Advantageous Effects of Invention

The present invention provides a technique for achieving verification of safety employing model inspection regarding a control system including a plurality of sensors.

BRIEF DESCRIPTION OF THE DRAWINGS

The above-described object, the other objects, features, and advantages will become more apparent from suitable example embodiments described below and the following accompanying drawings.

FIG. 9 is a flowchart illustrating a flow of processing to be executed by the information processing apparatus according to the example embodiment 2.

EXAMPLE EMBODIMENT

In the following, example embodiments according to the present invention are described with reference to the drawings. Note that, in all of the drawings, similar constituent element is designated by similar reference sign, and description thereof is omitted as necessary. Further, in each block diagram, each block represents a configuration of a functional unit instead of a configuration of a hardware unit unless otherwise specifically described.

Example Embodiment 1

<Overview of Invention>

Figure 1:
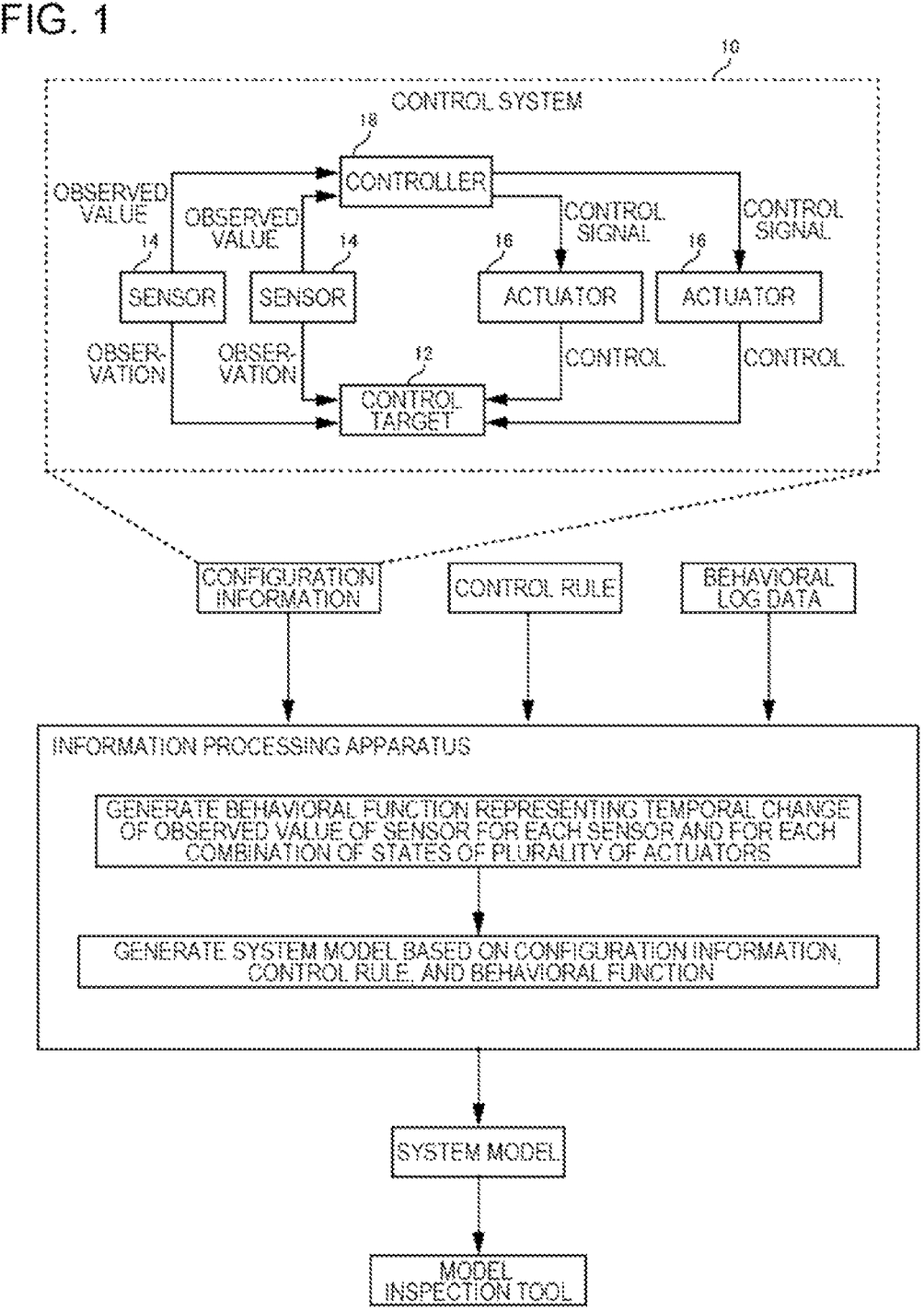
FIG. 1 is a diagram illustrating an overview of an information processing apparatus according to an example embodiment 1.

FIG. 1 is a diagram illustrating an overview of an information processing apparatus 2000 according to an example embodiment 1. The overview illustrated in FIG. 1 is an example for facilitating comprehension of the information processing apparatus 2000, and does not limit a function of the information processing apparatus 2000.

The information processing apparatus 2000 generates a model (hereinafter, a system model) of a control system 10. The system model is employed for verifying safety of the control system 10 by model inspection. Specifically, by analyzing a system model with use of a model inspection tool, an attack procedure (scenario), which may bring a control system to an anomalous state, is investigated. When an attack scenario which may bring a control system to an anomalous state is found, it is clear that the control system 10 is fragile against an attack represented by the attack scenario.

As illustrated in FIG. 1, the control system 10 to be handled by the information processing apparatus 2000 includes a control target 12, a plurality of sensors 14, a plurality of actuators 16, and a controller 18. The sensor 14 measures a physical value pertaining to the control target 12, and outputs a result of the measurement. For example, when the control target 12 is a water storage tank, the sensor 14 is a sensor for measuring an amount of water in the water storage tank, and the like.

The actuator 16 is an apparatus for controlling the physical value to be measured by the sensor 14. For example, it is assumed that the control target 12 is a water storage tank, and the sensor 14 measures an amount of water within the water storage tank. In this case, for example, the actuator 16 is a pump for controlling inflow of water into the water storage tank.

The controller 18 controls an operation of the actuator 16. For example, when the actuator 16 is the above-described pump, the controller 18 is a programmable logic controller (PLC) for switching a state of the pump between ON and OFF, and the like.

The system model of the control system 10 is generated by using, in addition to configuration information representing a configuration of the control system 10 (specifically, configurations of the sensor 14, the actuator 16, and the controller 18 included in the control system 10), a control rule and a behavioral function. The control rule is a rule of control to be performed by the controller 18, and defines how the controller 18 controls the actuator 16, based on an observed value of the sensor 14. For example, when the controller 18 controls a pump of a water storage tank, based on an amount of water detected by the sensor 14 for detecting an amount of water in the water storage tank, a relation between the amount of water to be detected by the sensor 14, and control (ON/OFF of the pump) to be performed for the actuator 16 by the controller 18 is defined as a control rule.

The behavioral function is a function representing a temporal change of an observed value of the sensor 14, and is generated by the information processing apparatus 2000. In other words, the behavioral function represents a behavior of the control target 12 to be observed by the sensor 14. Herein, the behavior of the control target 12 is determined by combination of states of the plurality of actuators 16 for controlling a behavior of the control target 12. In view of the above, a behavioral function corresponding to a certain sensor 14 is generated for each combination of the states of the plurality of actuators 16. For example, when two actuators 16 which may take two states of ON and OFF are included in the control system 10, there are four combinations of (OFF, ON), (ON, OFF), (OFF, OFF), and (ON, ON), as combinations of the states of these actuators. In view of the above, a behavioral function corresponding to the sensor 14 is generated for each of these four combinations.

<Advantageous Effect>

In the information processing apparatus 2000 according to the present example embodiment, a system model for performing model inspection of the control system 10 is generated. The system model is generated by using configuration information representing a configuration of the control system 10 including the plurality of sensors 14, a control rule for controlling the actuator 16 by the controller 18 according to an observe value of each of the plurality of sensors 14, and a behavioral function representing a temporal change of the observed value of each of the plurality of sensors 14. Then, the behavioral function is generated for each of the combinations of the states of the plurality of actuators 16. In the system model as described above, it is possible to represent an observed value of each of the plurality of sensors 14, and a behavior of the control system 10 according to the observed value, and thus, model inspection of the control system 10 including the plurality of sensors 14 is enabled.

In the following, the information processing apparatus 2000 according to the present example embodiment is described in more detail.

Example of Functional Configuration

Figure 2:
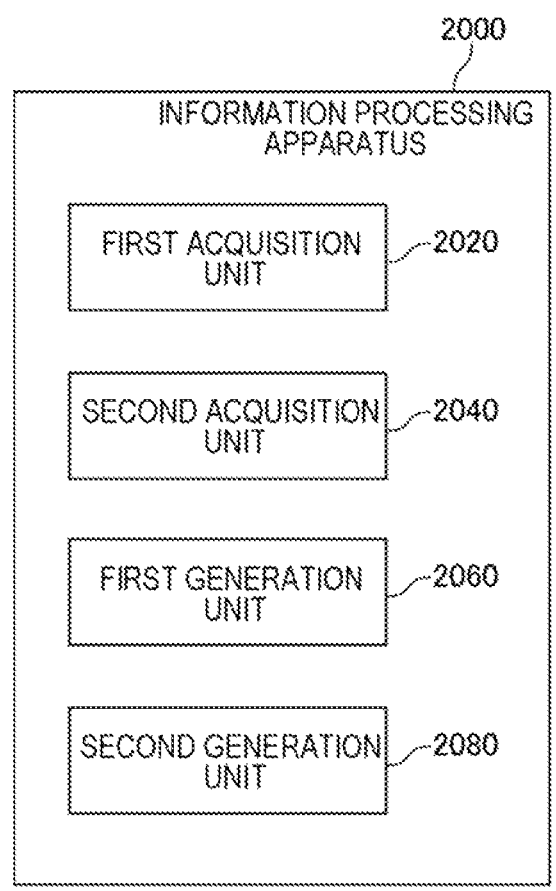
FIG. 2 is a diagram illustrating a functional configuration of the information processing apparatus according to the example embodiment 1.

FIG. 2 is a diagram illustrating a functional configuration of the information processing apparatus 2000 according to the example embodiment 1. The information processing apparatus 2000 includes a first acquisition unit 2020, a second acquisition unit 2040, a first generation unit 2060, and a second generation unit 2080. The first acquisition unit 2020 acquires configuration information of the control system 10, and a control rule regarding each of the actuators 16. The second acquisition unit 2040 acquires behavioral log data. By using the behavioral log data, the first generation unit 2060 generates, for each combination of the states of the actuators 16 and for each sensor 14, a behavioral function representing a temporal change of a physical value to be observed by the sensor 14 regarding the combination of the states of the plurality of actuators. The second generation unit 2080 generates a system model of the control system 10 by using the configuration information, the control rule, and the behavioral function.

<Hardware Configuration of Information Processing Apparatus 2000>

Each functional configuration unit of the information processing apparatus 2000 may be achieved by hardware (example: a hard-wired electronic circuit, and the like) for achieving each functional configuration unit, or may be achieved by combination of hardware and software (example: combination of an electronic circuit and a program for controlling the electronic circuit, and the like). In the following, a case where each functional configuration unit of the information processing apparatus 2000 is achieved by combination of hardware and software is further described.

Figure 3:
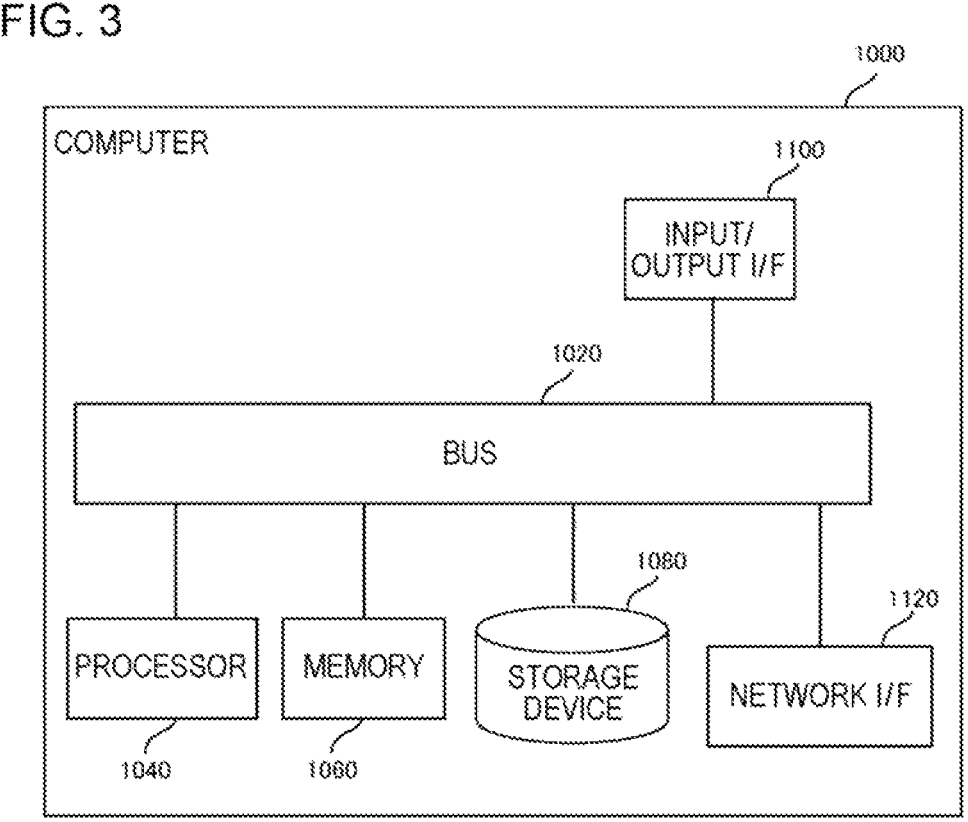
FIG. 3 is a diagram illustrating a computer for achieving an information processing apparatus.

FIG. 3 is a diagram illustrating a computer 1000 for achieving the information processing apparatus 2000. The computer 1000 is any computer. For example, the computer 1000 is a stationary computer such as a personal computer (PC) and a server machine. In addition to the above, for example, the computer 1000 is a portable computer such as a smartphone and a tablet terminal. The computer 1000 may be a dedicated computer designed for achieving the information processing apparatus 2000, or may be a general-purpose computer.

The computer 1000 includes a bus 1020, a processor 1040, a memory 1060, a storage device 1080, an input/output interface 1100, and a network interface 1120. The bus 1020 is a data transmission path along which the processor 1040, the memory 1060, the storage device 1080, the input/output interface 1100, and the network interface 1120 mutually transmit and receive data. However, a method of mutually connecting the processor 1040 and the like is not limited to bus connection.

The processor 1040 is a variety of processors such as a central processing unit (CPU), a graphics processing unit (GPU), and a field-programmable gate array (FPGA). The memory 1060 is a main storage apparatus to be achieved by using a random access memory (RAM) or the like. The storage device 1080 is an auxiliary storage apparatus to be achieved by using a hard disk, a solid state drive (SSD), a memory card, a read only memory (ROM), or the like.

The input/output interface 1100 is an interface for connecting the information processing apparatus 1000 to an input/output device. For example, the input-output interface 1100 is connected to an input apparatus such as a keyboard, and an output apparatus such as a display apparatus.

The network interface 1120 is an interface for connecting the computer 1000 to a network. The network is, for example, a local area network (LAN) or a wide area network (WAN). A method of connecting to a network by the network interface 1120 may be wireless connection or may be wired connection.

The storage device 1080 stores a program module for achieving each functional configuration unit of the information processing apparatus 2000. The processor 1040 achieves a function corresponding to each program module by reading and executing each program module in the memory 1060.

<Flow of Processing>

Figure 4:
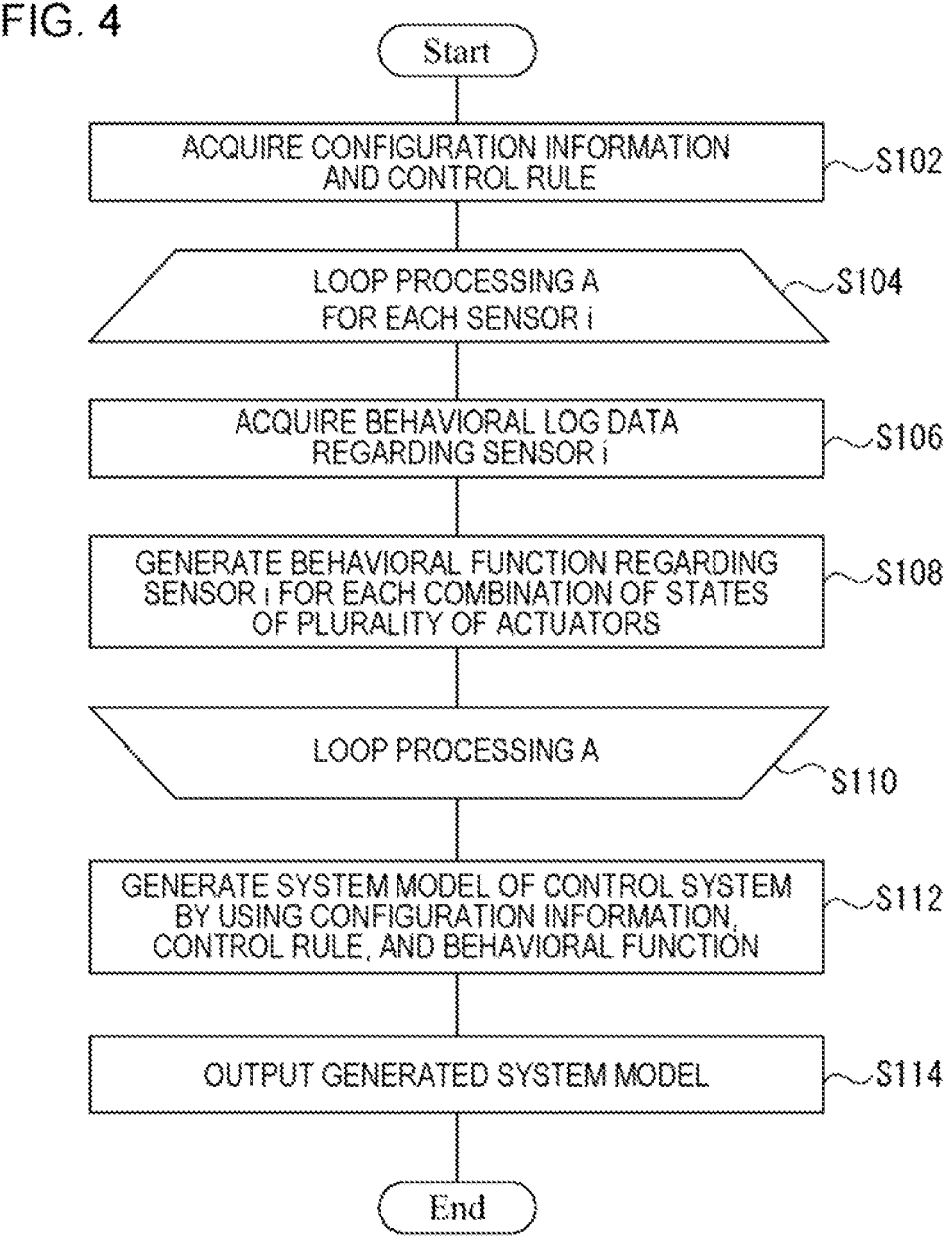
FIG. 4 is a flowchart illustrating a flow of processing to be executed by the information processing apparatus according to the example embodiment 1.

FIG. 4 is a flowchart illustrating a flow of processing to be executed by the information processing apparatus 2000 according to the example embodiment 1. The first acquisition unit 2020 acquires configuration information of the control system 10, and a control rule regarding each of the actuators 16 (S102).

S104 to S110 are loop processing A to be executed for each of the plurality of sensors 14. In S104, the information processing apparatus 2000 determines whether the loop processing A has been executed for all the sensors 14 as a target. When the loop processing A has already been executed for all the sensors 14, the processing of FIG. 4 proceeds to S112. On the other hand, when there is a sensor 14 yet to be a target of the loop processing A, the processing of FIG. 4 proceeds to S106. At a time of proceeding to S106, the information processing apparatus 2000 selects one of the sensors 14 yet to be a target of the loop processing A. The sensor 14 to be selected herein is referred to as a sensor i.

The second acquisition unit 2040 acquires behavioral log data pertaining to a physical value observed by the sensor i (S106). The first generation unit 2060 generates a behavioral function regarding the sensor i by using the acquired behavioral log data (S108). Since S110 is an end of the loop processing A, the processing of FIG. 4 proceeds to S104.

In S112, the second generation unit 2080 generates a system model of the control system 10 by using the configuration information, the control rule, and the behavioral function. The information processing apparatus 2000 outputs the generated system model (S114).

<Regarding Configuration Information>

The configuration information is information representing a configuration of the control system 10. Specifically, the configuration information represents a set of the sensors 14, a set of the actuators 16, and a set of the controllers 18 included in the control system 10. Note that, the number of the controllers 18 may be less than the number of the actuators 16. In this case, there is a controller 18 for controlling a plurality of actuators 16.

The configuration information further includes a first correspondence information indicating by which one of the sensors 14, the actuator 16 controls a physical value to be observed. For example, it is assumed that an actuator a1 controls a physical value to be observed by a sensor s1. In this case, the first correspondence information indicates a correspondence (a1, s1).

The configuration information further includes second correspondence information representing which one of the actuators 16, the controller 18 controls based on a physical value acquired from which one of the sensors 14. For example, it is assumed that a controller c1 controls the actuator a1 by using a physical value acquired from the sensor s1. In this case, the second correspondence information indicates a correspondence (c1, s1, a1).

There are various methods of acquiring configuration information by the first acquisition unit 2020. For example, the first acquisition unit 2020 acquires the configuration information by accessing to a storage apparatus storing the configuration information. In addition to the above, for example, the first acquisition unit 2020 acquires the configuration information by receiving the configuration information to be transmitted from another apparatus.

<Regarding Control Rule>

The control rule is a rule representing how the controller 18 controls the actuator 16, based on an observed value of the sensor 14. More specifically, the control rule is written in such a way that a state of the actuator 16 at a time t+1 or at any time thereafter is set, based on an observed value acquired from the sensor 14 by the controller 18 at a certain time t. For example, the control rule is written in such a way that control "when an observed value of the sensor 14 is equal to larger than a threshold value H at the time t, the state of the actuator 16 is changed to OFF at the time t+1" is achieved.

The control rule is needed to be written in a format interpretable by a model inspection tool for performing model inspection by employing a system model to be generated by the information processing apparatus 2000. The control rule may be generated by a person, or may be generated by the information processing apparatus 2000. In the former case, for example, the first acquisition unit 2020 acquires a control rule by accessing to a storage apparatus storing the control rule, or receiving the control rule transmitted from another apparatus. In the latter case, the first acquisition unit 2020 acquires a control rule generated inside the information processing apparatus 2000.

Figure 5:
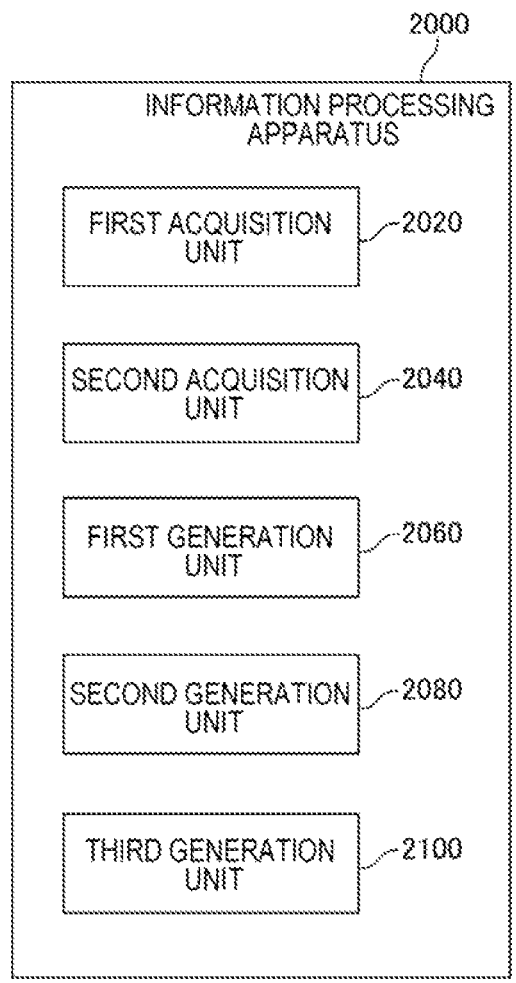
FIG. 5 is a diagram illustrating an information processing apparatus including a third generation unit.

In the latter case, the information processing apparatus 2000 acquires information which is written in a format non-interpretable by a model inspection tool and in which control of the actuator 16 by the controller 18 is defined, and converts the acquired information into information (specifically, a control rule) interpretable by the model inspection tool. A configuration function unit performing the conversion is referred to as a third generation unit 2100. FIG. 5 is a diagram illustrating the information processing apparatus 2000 including the third generation unit 2100.

For example, the third generation unit 2100 acquires a control program to be executed by the controller 18, and converts the control program into a control rule. In this case, the third generation unit 2100 includes a logic for converting the control program into the control rule. In addition to the above, for example, the third generation unit 2100 may acquire information written in a natural language, and convert the information into a control rule. In this case, the third generation unit 2100 includes a logic for converting the information written in the natural language into the control rule. Note that, a method of acquiring information for converting into a control rule by the third generation unit 2100 is similar to a method of acquiring a control rule by the first generation unit 2060, which is described in the following.

<Regarding Behavioral Log Data>

The behavioral log data indicate time-series data of a physical value observed by the sensor 14 in association with a state of each of the plurality of actuators 16. More specifically, the behavioral log data indicate a correspondence among "a time, a physical value observed by the sensor 14 at the time, and a state of each of the actuators 16 at the time". A time width of the time-series data indicated by the behavioral log data is optional, and is a time width such as one second or ten seconds, for example.

Figure 6:
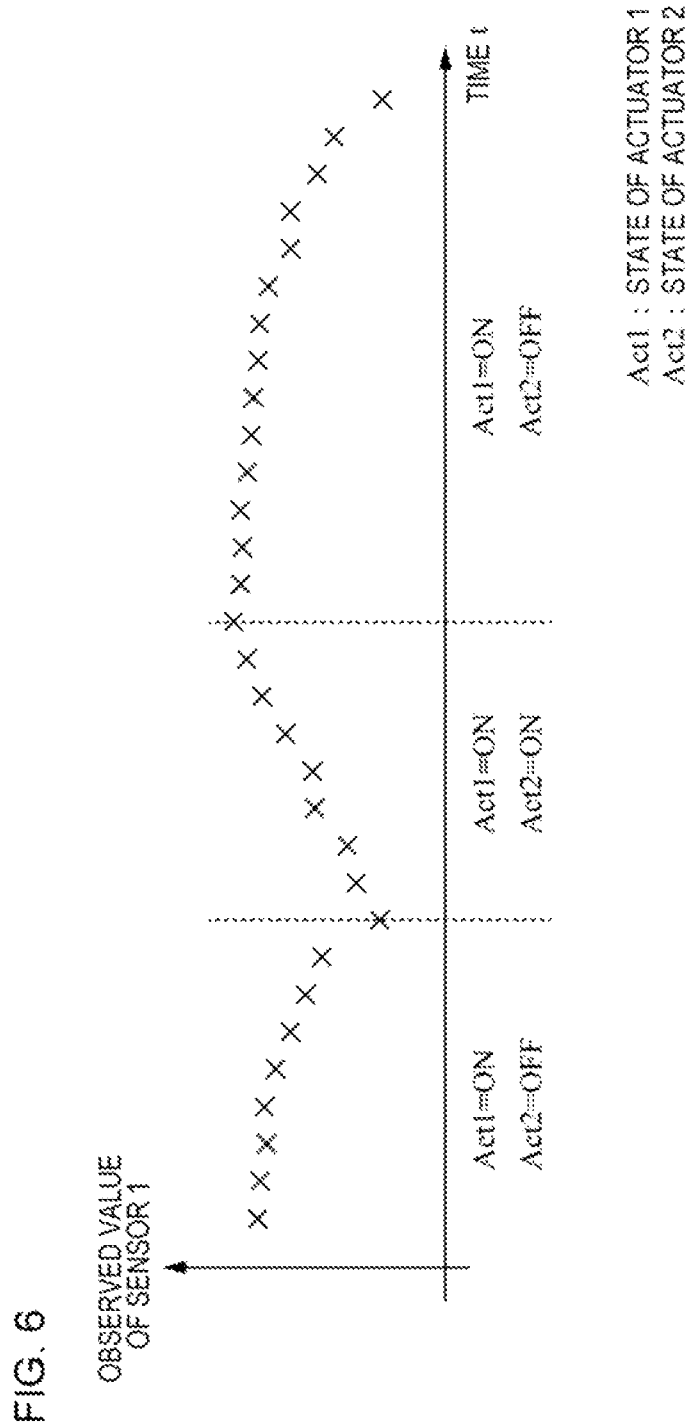
FIG. 6 is a diagram illustrating information indicated by behavioral log data in terms of a graph.

FIG. 6 is a diagram illustrating information indicated by the behavioral log data in terms of a graph. The horizontal axis indicates a time, and the vertical axis indicates an observed value. A timing at which combination of states of the plurality of actuators 16 changes is indicated by a dotted line. As illustrated by the example of the graph, it is often the case that a scene of a temporal change of an observed value of the sensor 14 differs for each combination of states of the plurality of actuators 16. Therefore, as will be described later, a behavioral function is generated for each combination of states of the plurality of actuators 16.

The behavioral log data of the sensor 14 are generated, for example, by actually operating the control system 10, and recording an observed value of the sensor 14 and a state of each of the actuators 16 at each time. In addition to the above, for example, the behavioral log data may be generated by simulating an operation of the control system 10. Note that, it is possible to use an existing technique, as a technique for simulating an operation of the control system 10 employing a computer, and acquiring a behavioral log of the control system 10.

There are various methods of acquiring behavioral log data by the second acquisition unit 2040. For example, the second acquisition unit 2040 acquires behavioral log data from a storage apparatus storing the behavioral log data. In addition to the above, for example, the second acquisition unit 2040 may acquire behavioral log data by receiving the behavioral log data transmitted from another apparatus.

<Behavioral Function Generation: S108>

The first generation unit 2060 generates a behavioral function representing a temporal change of an observed value of the sensor 14 for each combination of states of the plurality of actuators 16 by using behavioral log data of the sensor 14 (S108). The behavioral function is generated for each sensor 14. Herein, a set of behavioral functions to be generated for a certain sensor i is referred to as a behavioral function set Fi. When it is assumed that a total number of sensors is n, n behavioral function sets F1, F2, . . . , and Fn are generated by the first generation unit 2060.

The behavioral function set Fi includes a behavioral function fij(t) corresponding to each combination cj of states of the plurality of actuators 16. t represents a time. Specifically, Fi={fi1(t), fi2(t), ..., fim(t)}. m is, for example, a total number of combinations of states of the plurality of actuators 16. However, a behavioral function included in the behavioral function set Fi may be generated by focusing only on a combination of states of the actuators 16 that affects an observed value of the sensor i. In this case, the total number m of behavioral functions included in the behavioral function set Fi becomes a total number of combinations of states of the actuators 16 that affect an observed value of the sensor i.

For example, it is assumed that three actuators 16, each of which may take two states, are included in the control system 10. In this case, a total number of combinations of states which may be taken by the actuators 16 is eight. However, when only two of the three actuators 16 affect an observed value of the sensor 14, a behavioral function is generated for each of combinations of states of these two actuators 16, and the total number of the combinations becomes four. Note that, a correspondence between the sensor 14, and the actuator 16 for performing control that affects an observed value of the sensor 14, is indicated in the above-described first correspondence information.

The first generation unit 2060 sorts out the behavioral log data of the sensor i in an ascending order of an observation time, and divides the plurality of pieces of sorted behavioral log data for each section in which combinations of states of the plurality of actuators 16 are the same. Then, the first generation unit 2060 generates, for each section, a function representing a temporal change of an observed value of the sensor i by using time-series data of the observed value of the sensor i included in the section. However, there is a case that there is a plurality of sections in which combination of states of the actuators 16 is cj. In this case, for example, the first generation unit 2060 generates a behavioral function fij(t) corresponding to the combination cj of states by using a section having a longest time width among the plurality of sections.

Figure 7:
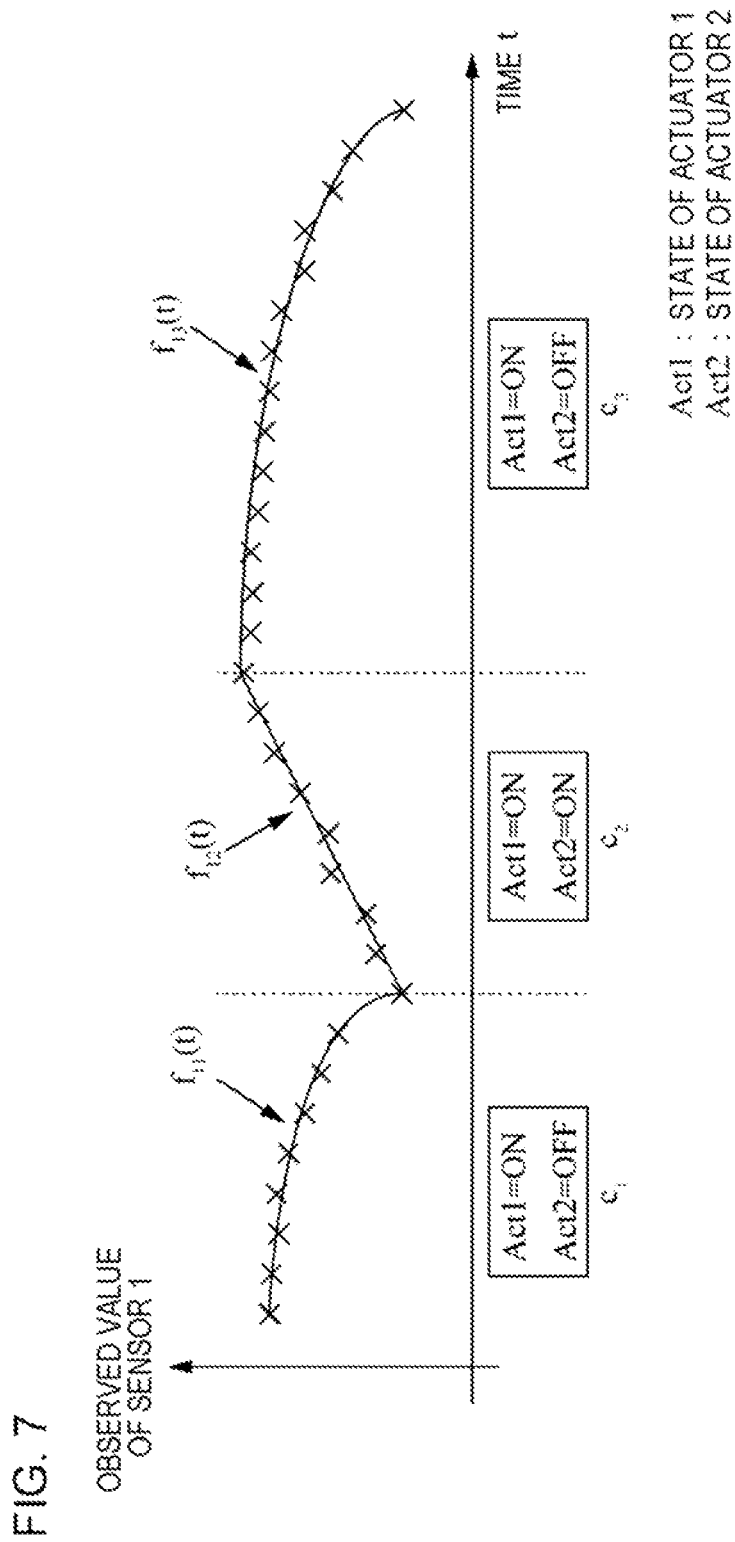
FIG. 7 is a diagram illustrating a scene in which a behavioral function is generated for each combination of states of a plurality of actuators.

FIG. 7 is a diagram illustrating a scene in which a behavioral function is generated for each combination of states of the plurality of actuators 16. An observed value of the sensor 14 illustrated in FIG. 7 is the same as illustrated in FIG. 6. In this example, a temporal change of an observed value of a sensor 1 depends on combination of states of two actuators 1 and 2. In view of the above, the first generation unit 2060 generates a behavioral function for each combination of states of these two actuators 16. FIG. 7 illustrates c1 to c3, as combinations of states of the two actuators 16. Therefore, three behavioral functions of f11(t) corresponding to c1, f12(t) corresponding to c2, and f13(t) corresponding to c3 are generated as behavioral functions of the sensor 1.

The behavioral function can be generated as a prediction model for predicting a temporal change of an observed value of the sensor 14. As types of the prediction model, any regression model such as a linear regression model and a multiple regression model can be employed. For example, when the multiple regression model is employed, a behavioral function fij(t) can be generated by solving a least squares problem described as below.

[Formula 1]

$$f_{i,j}(t) = \alpha_0 + \alpha_1 t + \cdots + \alpha_{d-1} t^{d-1} + \alpha_d t^d \quad (1)$$

$$\operatorname*{argmin}_{\alpha_0, \ldots, \alpha_d} \sum_t |f_{i,j}(t) - y_{i,j}(t)| \quad (2)$$

Herein, |•| is a symbol representing a norm. As the norm, for example, L2 norm can be employed.

In the above-described expression (2), yij(t) is an observed value indicated by data in which the combination of the states of the actuators 16 is cj among the behavioral log data of the sensor i. However, the behavioral log data are used by being replaced into relative data such that first time data in which the combination of the states of the actuators 16 becomes cj serves as a reference. Specifically, the behavioral log data are used by subtracting, from a time and an observed value of each piece of data, a first time when the combination of the states of the actuators 16 becomes cj, and an observed value at the time. However, regarding the observed value, a0 may be replaced into 0, after the behavioral function fij(t) is generated by using data indicated by the behavioral log data as themselves.

A degree d in the equation (1) may be any value that is determined in advance, or may be determined by the first generation unit 2060 for each combination cj of the states of the actuators 16. In the latter case, for example, the first generation unit 2060 generates a plurality of candidates of the behavioral function fij(t) by changing the degree in various ways, and determines an optimum degree by evaluating a behavioral function of each degree with use of an index (e.g., Akaike information criterion (AIC) or Bayesian information criterion (BIC)) for evaluating quality of a statistical model. For example, when AIC or BIC is employed as an index value, the degree d with which an index value to be computed is minimized becomes an optimum degree.

Herein, employing the behavioral function has an advantage that it is possible to accurately simulate a behavior of the control system 10. In the following, the advantage is described. First, in NPL 1, an observed value of a sensor becomes any of the values at ten stages of {UF, LL, L2, L1, L, H, H1, H2, HH, OF}. Then, the observed value of the sensor changes by one stage, each time simulation proceeds by one unit time. This means that a duration of one unit time of simulation is inevitably extended to such an extent that the observed value of the sensor changes by one stage.

When one unit time of simulation is long as described above, it is difficult to simulate a timing of control by the controller 18 with fine granularity, and consequently, it is difficult to simulate a behavior of the control target 12 with fine granularity. For example, a phenomenon that the observed value of the sensor changes from UF to LL within one unit time means that it is difficult to simulate a condition in which the observed value of the sensor lies between UF and LL. In particular, in the control system 10 in which there are a plurality of sensors 14 to be handled by the information processing apparatus 2000, the order of control by the controller 18, based on observed values of these sensors 14, greatly affects the behavior of the entirety of the control system 10. Therefore, it is necessary to simulate a timing of control by the controller 18 with fine granularity in order to accurately simulate the behavior of the control system 10.

In contrast, the information processing apparatus 2000 can express an observed value of a sensor with fine granularity, as compared with a system model disclosed in NPL1 and the like, by determining a behavioral function with use of the above-described polynomial and the like. Therefore, it is possible to shorten one unit time of simulation, and simulate a timing of control by the controller 18 with fine granularity. Thus, it is possible to accurately simulate a behavior of the control system 10.

<System Model Generation: S112>

The second generation unit 2080 generates a system model of the control system 10 by using the configuration information and the control rule acquired by the first acquisition unit 2020, and the plurality of behavioral function sets F1 to Fn generated by the first generation unit 2060.

The system model is information that expresses a temporal change of a behavior of the control system 10 (control by the controller 18, a state of the actuator 16, and an output value of the sensor 14). For example, "how the state of the actuator 16 changes during a period from the time t to the time t+1" is represented by a state of the actuator 16 and an output value of the sensor 14 at the time t, and control of the controller 18 according to the output value. By comprehensively tracking the temporal change of the state of the control system 10 as described above in order from an initial state, it is possible to comprehensively investigate a state change, which may occur in the control system 10.

The system model is generated according to implementing of a model inspection tool in such a way that the system model is handled by the model inspection tool for use in model inspection. For example, the system model is achieved as data in which configuration information, a control rule, and a behavioral function set are configured as a set. In addition to the above, for example, the system model is achieved as data in which configuration information, and a control rule incorporated with a behavioral function set are configured as a set. Herein, the control rule incorporated with the behavioral function set means a rule in which an associated behavioral function is embedded in a control rule at a position where a value of a sensor is referred to.

<System Model Output: S114>

The second generation unit 2080 outputs the generated system model (S114). Herein, model inspection using the generated system model may be performed by the information processing apparatus 2000, or may be performed by an apparatus other than the information processing apparatus 2000. In the former case, the second generation unit 2080 causes any storage apparatus to store the generated system model. The information processing apparatus 2000 having a function of performing model inspection of the generated system model is described as a second example embodiment.

On the other hand, when inspection using the generated system model is performed by an apparatus other than the information processing apparatus 2000, the second generation unit 2080 outputs the system model in a manner acquirable by an apparatus (hereinafter, inspection apparatus) using the system model. For example, the second generation unit 2080 may cause a storage apparatus accessible from an inspection apparatus to store the system model, or transmit the system model to an inspection apparatus.

Example Embodiment 2

Figure 8:
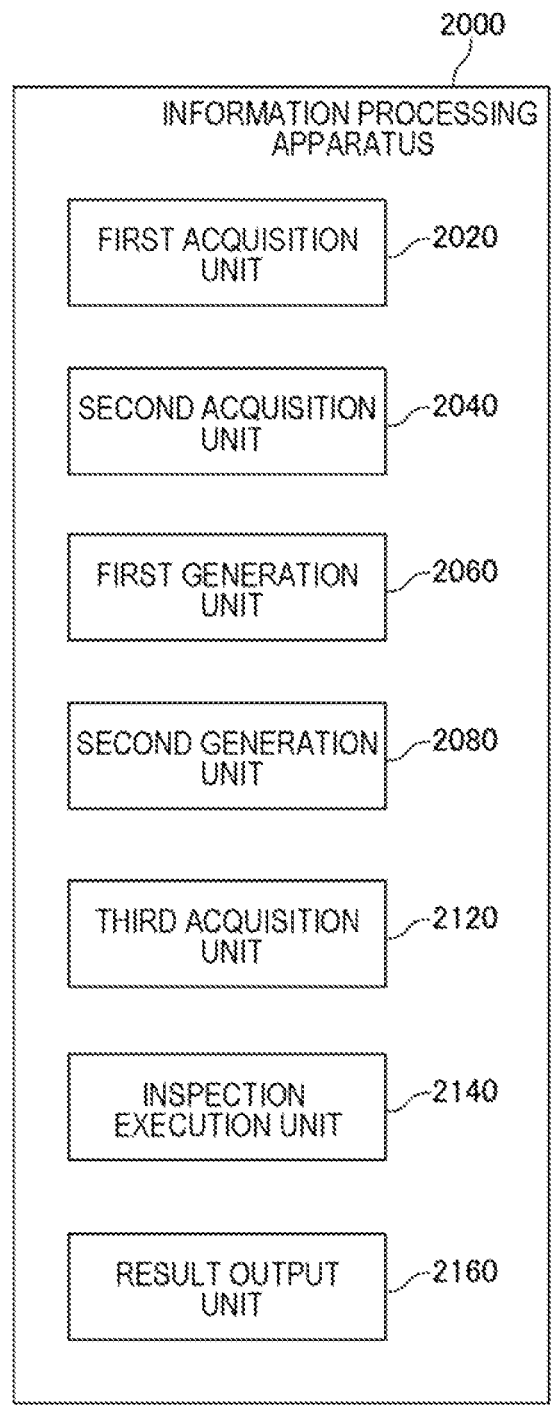
FIG. 8 is a diagram illustrating a functional configuration of an information processing apparatus according to an example embodiment 2.

FIG. 8 is a diagram illustrating a functional configuration of an information processing apparatus 2000 according to an example embodiment 2. The information processing apparatus 2000 according to the example embodiment 2 has a function of performing model inspection by using a system model generated by a second generation unit 2080. For this reason, the information processing apparatus 2000 includes a third acquisition unit 2120 and an inspection execution unit 2140. The third acquisition unit 2120 acquires an attack rule and attack information indicating an attack goal. A method of acquiring the attack rule and the attack information is similar to a method of acquiring configuration information and the like.

The attack rule is information in which an attack executable against a control system 10 by an attacker is written. As an example of the attack, "rewrite an observed value of a certain sensor 14 into any value", and the like are exemplified. For example, when a combination of states of actuators 16 at a time t is cj, a value that should be inherently acquired by a controller 18 as an observed value of a sensor i is fij(t). However, when the above-described attack is executed, a value acquired by the controller 18 is changed to any value other than fij(t).

As another example of the attack, "change a state of a certain actuator 16 to any state", and the like are exemplified. Inherently, a state of the actuator 16 is controlled based on a control rule. However, when the above-described attack is executed, the state of the actuator 16 is changed to any state that does not depend on the control rule.

The attack goal is a target of an attack by an attacker. An attacker executes an attack for shifting a control target 12 to be controlled by the control system 10 to a desired state. Therefore, the attack goal represents a state of the control target 12 being a target of an attack. Herein, the state of the control target 12 is observed by the sensor 14. Therefore, the attack goal can be represented by an observed value of the sensor 14. For example, when the control target 12 is a water storage tank, and an attack of "overflowing water from the water storage tank" is executed, the attack goal can be represented as "an observed value of the sensor 14 for observing an amount of water in the water storage tank>an upper limit value of the water storage amount".

The inspection execution unit 2140 performs model inspection by using the system model generated by the second generation unit 2080 and the attack information. Herein, as a mechanism for performing model inspection by using combination of a system model, an attack rule, and an attack goal, an existing model inspection tool such as the above-described Alloy Analyzer can be employed.

The model inspection tool such as Alloy Analyzer performs verification as to whether a specification of the system model is correct. For example, the inspection execution unit 2140 sets an attack goal as a specification, and then, performs model inspection of the system model by the model inspection tool. The model inspection tool comprehensively investigates a state that can be taken by the system model, based on a control rule and an attack rule, and determines whether the set specification is correct. Herein, determining that the specification is correct means that the attack goal is attained. On the other hand, determining that the specification is not correct means that the attack goal is not attained. In view of the above, a series of attacks that are executed when the specification is determined to be correct can be acquired as an attack scenario capable of attaining the attack goal.

Herein, a result of investigation by the model inspection tool changes depending on a state of the system model (specifically, setting of an initial value) when the investigation is started. Therefore, executing the model inspection tool while changing the initial value in various ways is appropriate. In view of the above, for example, the investigation result corresponding to each initial setting is acquired by causing a user of the model inspection tool to operate the information processing apparatus 2000 while changing the initial value setting in various ways. The operation of executing the model inspection tool while changing the initial value in this way may be automatically performed by the inspection execution unit 2140.

A result output unit 2160 outputs a result of model inspection performed by the inspection execution unit 2140. Specifically, when an attack scenario (a series of attack procedures) capable of attaining an attack goal is acquired, the result output unit 2160 outputs scenario information representing the attack scenario. For example, the scenario information is information in which one or more combinations of an executed attack and a timing (time) when the attack has been executed are listed. By outputting the scenario information, a user can easily recognize fragility of the control system 10.

The result output unit 2160 may further output, together with the scenario information, time-series data of an observed value of each of the sensors 14, and time-series data of a state change of each of the actuators 16. By also outputting these pieces of information, a user can recognize how the attack goal is attained, with the state of the control system 10 being changed.

The result output unit 2160 may further output information representing a time until the attack goal is attained by the attack scenario indicated by the scenario information. Herein, generally, in model inspection, simulation proceeds by a unit time of a certain interval. The unit time is referred to as a tick, and the like. For example, when the tick is set to ten seconds, the model inspection proceeds at a time interval of ten seconds. Specifically, the time t+1 becomes a time after ten seconds from the time t.

The result output unit 2160 may output a time until the attack goal is attained in terms of a simulation time (specifically, the number of ticks), or may be output in terms of an actual time to be estimated. For example, it is assumed that the attack goal is attained by k ticks, and the tick interval is b seconds. In this case, the result output unit 2160 may output, as a time until the attack goal is attained, information representing a simulation time indicating "k ticks", or may output information representing a real time indicating "k*b seconds".

Note that, an output destination to which the result output unit 2160 outputs various pieces of the above-described information is optional. For example, the result output unit 2160 causes a storage apparatus to store information, causes a display apparatus to display information, or transmit information to another apparatus.

Example of Hardware Configuration

Similarly to the information processing apparatus 2000 according to the example embodiment 1, a hardware configuration of the information processing apparatus 2000 according to the example embodiment 2 is illustrated in FIG. 3, for example. However, a program module for achieving a function of the information processing apparatus 2000 according to the example embodiment 2 is stored in a storage device 1080 according to the example embodiment 2.

<Flow of Processing>

FIG. 9 is a flowchart illustrating a flow of processing to be executed by the information processing apparatus 2000 according to the example embodiment 2. The third acquisition unit 2120 acquires attack information (S202). The inspection execution unit 2140 performs model inspection of a system model by using the attack information (S204). The result output unit 2160 outputs a result of the model inspection (S206).

While the example embodiments of the present invention have been described with reference to the drawings, the example embodiments are only exemplification of the present invention, and various configurations other than the above-described example embodiments can also be employed.

A part or all of the above-described example embodiments may also be described as the following supplementary notes, but is not limited to the following.

1. An information processing apparatus including:
   a first acquisition unit that acquires configuration information representing a configuration of a system including a plurality of sensors for observing a physical value pertaining to a control target, a plurality of actuators for changing a behavior of the control target, and a controller for controlling each of the actuators, and a control rule representing a rule of control of each of the actuators by the controller;
   a second acquisition unit that acquires, for each of the sensors, behavioral log data indicating a combination of time-series data of the physical value observed by the sensor, and a state of each of the actuators at each time;
   a first generation unit that generates, for each combination of the states of the plurality of actuators and for the each sensor, a behavioral function representing a temporal change of the physical value to be observed by the sensor regarding the combination of the states of the actuators by using the behavioral log data; and
   a second generation unit that generates a system model of the system by using the configuration information, the control rule, and the behavioral function.

2. The information processing apparatus according to supplementary note 1, wherein
   the first generation unit, for each of the plurality of sensors,
   divides time-series data of the physical value observed by the sensor into a plurality of sections in which the combinations of the states of the plurality of actuators are different from one another, and
   generates, as the behavioral function corresponding to the section, a prediction model predicting a temporal change of the physical value represented by time-series data included in the section, for each of the plurality of sections.

3. The information processing apparatus according to supplementary note 2, wherein
   the prediction model is a multiple regression model.

4. The information processing apparatus according to any one of supplementary notes 1 to 3, further including:
   a third acquisition unit that acquires an attack rule representing an attack executable against the system by an attacker, and an attack goal representing a state, targeted by an attacker, of the system;
   an inspection execution unit that investigates an attack procedure according to which the state of the system is shifted to the state indicated by the attack goal by using the system model, the attack rule, and the attack goal; and
   a result output unit that outputs a result of inspection by the inspection execution unit.

5. A control method to be executed by a computer, the method including:
   a first acquisition step of acquiring configuration information representing a configuration of a system including a plurality of sensors for observing a physical value pertaining to a control target, a plurality of actuators for changing a behavior of the control target, and a controller for controlling each of the actuators, and a control rule representing a rule of control of each of the actuators by the controller;

a second acquisition step of acquiring, for each of the sensors, behavioral log data indicating a combination of time-series data of the physical value observed by the sensor, and a state of each of the actuators at each time;

a first generation step of generating, for each combination of states of the plurality of actuators and for the each sensor, a behavioral function representing a temporal change of the physical value to be observed by the sensor regarding the combination of the states of the actuators, by using the behavioral log data; and a second generation step of generating a system model of the system by using the configuration information, the control rule, and the behavioral function.

6. The control method according to supplementary note 5, wherein the first generation step includes, for each of the plurality of sensors, dividing time-series data of the physical value observed by the sensor into a plurality of sections in which the combinations of the states of the plurality of actuators are different from one another, and generating, as the behavioral function corresponding to the section, a prediction model predicting a temporal change of the physical value represented by time-series data included in the section, for each of the plurality of sections.

7. The control method according to supplementary note 6, wherein the prediction model is a multiple regression model.

8. The control method according to any one of supplementary notes 5 to 7, further including:

a third acquisition step of acquiring an attack rule representing an attack executable against the system by an attacker, and an attack goal representing a state, targeted by an attacker, of the system;

an inspection execution step of investigating an attack procedure according to which the state of the system is shifted to the state indicated by the attack goal by using the system model, the attack rule, and the attack goal; and a result output step of outputting a result of inspection by the inspection execution step.

9. A program causing a computer to execute each step of the control method according to any one of supplementary notes 5 to 8.

What is claimed is:

1. An information processing apparatus comprising:
at least one memory configured to store instructions; and
at least one processor configured to execute the instructions to:
acquire configuration information representing a configuration of a system including a plurality of sensors for observing a physical value pertaining to a control target, a plurality of actuators for changing a behavior of the control target, and a controller for controlling each of the actuators, wherein the configuration information includes correspondence information representing a correspondence between each sensor and a corresponding actuator that affects the physical value observed by the sensor;

acquire a plurality of control rule representing rules of control of the actuators by the controller based on the physical value observed by the sensors;

acquire, for each sensor, behavioral log data indicating a plurality of combinations of time-series data of the physical value observed by the sensor, and a state of each actuator at each of a plurality of times;

generate, for each combination for each sensor, a behavioral function representing a temporal change of the physical value observed by the sensor regarding the combination by using the behavioral log data; and generate a system model of the system as data in which by using the configuration information, the control rule, and the behavioral function are configured as a set in which the behavioral function associated with the sensor is embedded in the control rule at a position where a value of the sensor is referred to, wherein the at least one processor is further configured to execute the instructions to:

acquire an attack rule representing an attack executable against the system by an attacker, and an attack goal representing a state, targeted by an attacker, of the system;

execute inspection of the system model by investigating an attack procedure according to which the state of the system is shifted to a status indicated by the attack goal by using the system model, the attack rule, and the attack goal; and output a result of the inspection;

wherein the attack rule includes information representing at least one of an attack that rewrites an observed value of any sensor, and an attack that changes a state of any actuator, and wherein the at least one processor is further configured to execute the instructions to:

set a particular attack goal as a specification;

investigate a state that can be taken by the system model, based on the control rules and the particular attack rule;

determine whether the particular attack goal is attained or not in the specification;

acquire information in which one or more combinations of a given attack and a time when the given attack has been executed are listed as an attack scenario, the attack scenario capable of attaining a given attack goal and being a series of attacks that are performed when the given attack goal is attained; and output a result of the inspection, including the attack scenario.

2. The information processing apparatus according to claim 1, wherein the at least one processor is further configured to execute the instructions to, for each sensor, divide the time-series data of the physical value observed by the sensor into a plurality of sections in which the combinations are different from one another; and generate, as the behavioral function corresponding to the section, a prediction model predicting a temporal change of the physical value represented by the time-series data included in the section, for each section.

3. The information processing apparatus according to claim 2, wherein the prediction model is a multiple regression model.

4. A control method executable by a computer and comprising:

acquiring configuration information representing a configuration of a system including a plurality of sensors for observing a physical value pertaining to a control target, a plurality of actuators for changing a behavior of the control target, and a controller for controlling each of the actuators, wherein the configuration information includes correspondence information representing a correspondence between each sensor and a corresponding actuator that affects the physical value observed by the sensor;

acquiring a plurality of control rule representing rules of control of the actuators by the controller based on the physical value observed by the sensors;

acquiring, for each sensor, behavioral log data indicating a plurality of combinations of time-series data of the physical value observed by the sensor, and a state of each actuator at each of a plurality of times;

generating, for each combination for each sensor, a behavioral function representing a temporal change of the physical value observed by the sensor regarding the combination by using the behavioral log data; and generating a system model of the system as data in which the configuration information, the control rule, and the behavioral function are configured as a set in which the behavioral function associated with the sensor is embedded in the control rule at a position where a value of the sensor is referred to, wherein the control method further comprises:

acquiring an attack rule representing an attack executable against the system by an attacker, and an attack goal representing a state, targeted by an attacker, of the system;

executing inspection of the system model by investigating an attack procedure according to which the state of the system is shifted to a status indicated by the attack goal by using the system model, the attack rule, and the attack goal; and outputting a result of the inspection;

wherein the attack rule includes information representing at least one of an attack that rewrites an observed value of any sensor, and an attack that changes a state of any actuator, and wherein the control method further comprises:

set a particular attack goal as a specification;

investigating a state that can be taken by the system model, based on the control rules and the particular attack rule;

determining whether the particular attack goal is attained or not in the specification;

acquiring information in which one or more combinations of a given attack and a time when the given attack has been executed are listed as an attack scenario, the attack scenario capable of attaining a given attack goal and being a series of attacks that are performed when the given attack goal is attained; and outputting a result of the inspection, including the attack scenario.

5. The control method according to claim 4, further comprising:

for each of the plurality of sensors, dividing time-series data of the physical value observed by the sensor into a plurality of sections in which the combinations are different from one another, and generating, as the behavioral function corresponding to the section, a prediction model predicting a temporal change of the physical value represented by the time-series data included in the section, for each section.

6. The control method according to claim 5, wherein the prediction model is a multiple regression model.

7. A non-transitory computer-readable storage medium storing a program that causes the computer to execute the control method according to claim 4.

* * * * *